United States Patent
Hsu et al.

(10) Patent No.: US 9,142,194 B2
(45) Date of Patent: Sep. 22, 2015

(54) TRANSMISSION METHOD FOR DISPLAY DEVICE

(71) Applicant: NOVATEK Microelectronics Corp., Hsin-Chu (TW)

(72) Inventors: Chin-Hung Hsu, Taoyuan County (TW); Yu-Ming Chang, Taichung (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 35 days.

(21) Appl. No.: 14/250,391

(22) Filed: Apr. 11, 2014

(65) Prior Publication Data

US 2015/0154942 A1  Jun. 4, 2015

(30) Foreign Application Priority Data

Dec. 2, 2013  (TW) .............................. 102144074 A

(51) Int. Cl.
G09G 5/18 (2006.01)
G06T 1/20 (2006.01)

(52) U.S. Cl.
CPC ... G09G 5/18 (2013.01); G06T 1/20 (2013.01)

(58) Field of Classification Search
CPC ... G09G 5/18; G09G 2310/08; G09G 3/3696; G09G 3/3677; G09G 3/3648; G09G 2310/0286; G09G 3/20
See application file for complete search history.

(56) References Cited

U.S. PATENT DOCUMENTS

| | | | |
|---|---|---|---|
| 2009/0237395 A1 | 9/2009 | Lee | |
| 2011/0037758 A1* | 2/2011 | Lim et al. | 345/213 |
| 2011/0227892 A1* | 9/2011 | Wu et al. | 345/211 |
| 2011/0234262 A1* | 9/2011 | Weng | 327/108 |
| 2013/0076703 A1* | 3/2013 | Baek et al. | 345/204 |
| 2014/0118235 A1* | 5/2014 | Hong et al. | 345/87 |

FOREIGN PATENT DOCUMENTS

| | | |
|---|---|---|
| TW | 200842808 | 11/2008 |
| TW | 201108180 | 3/2011 |
| TW | 201227657 | 7/2012 |
| TW | 201303838 | 1/2013 |
| TW | 201306002 | 2/2013 |

* cited by examiner

*Primary Examiner* — Olga Merkoulova
(74) *Attorney, Agent, or Firm* — Winston Hsu; Scott Margo

(57) ABSTRACT

A transmission method for a display device is provided. The display device includes a one-to-many timing controller and a plurality of source drivers. The transmission method includes determining whether the plurality of source drivers being operated in different operational modes are switched on or off according to a command signal, to receive a display information of the one-to-many timing controller. The display information comprises at least a first control triggering signal, a first control signal, a first display information triggering signal, a first display signal, a second display information triggering signal and a second display signal, and the command signal is an internal setting signal or an external setting signal.

11 Claims, 9 Drawing Sheets

TRANSMISSION METHOD FOR DISPLAY DEVICE

BACKGROUND OF THE INVENTION

1. Field of the Invention

The present invention relates to a transmission method for a display device, and more particularly, to a transmission method which adaptively sets operations of a source driver being operated in different operational modes of a display device.

2. Description of the Prior Art

As technology advances, people gradually pursue higher resolution as well as thinner/smaller sizes of hardware devices. A conventional display device utilizes a one-to-one differential signal transmission method, such that a timing controller correspondingly transmits a differential signal to every source drivers via a single or a plurality of differential pairs to finish settings of every source drivers. Please refer to FIG. 1, which illustrates a schematic diagram of a conventional display device 10. The display device 10 is depicted with a part of composition modules/units for simple descriptions, and comprises a timing controller 100, a circuit board 102, source drivers SD_1-SD_N, high-speed transmission lines D0_PN_1-D0_PN_N and D1_PN_1-D0_PN_N and a low-speed transmission line LN. The display device 10 further comprises a display device control chip, a gate controller, a source controller, a backlight module, a plurality of display units, a display panel, and so on, which is not described hereinafter for brevity. As shown in FIG. 1, the timing controller 100 can utilize the high-speed transmission lines D0_PN_1-D0_PN_N and D1_PN_1-D0_PN_N and location information LOC of the source drivers SD_1-SD_N to transmit the differential pair signals corresponding to the source drivers SD_1-SD_N to the correct positions of the source drivers SD_1-SD_N by the one-to-one differential signal transmission method. In the meanwhile, the low-speed transmission line LN also transmits a corresponding control signal to the source drivers SD_1-SD_N to control the source drivers SD_1-SD_N being turned on or off. Other conventional timing controllers can also be utilized to directly transmit the control signal to the source drivers SD_1-SD_N without utilizing the location information LOC.

Please refer to FIG. 2, which illustrates a schematic diagram of a conventional transmission signal between the timing controller 100 and one of the source drivers SD_1-SD_N. As shown in FIG. 2, the timing controller 100 and the source drivers SD_1-SD_N have a high-speed transmission signal 20 via a high-speed transmission method and a low-speed transmission signal 22 via a low-speed transmission method, wherein the high-speed transmission signal comprises a control triggering signal 200, a control signal 202 corresponding to the control triggering signal 200, an information triggering signal 204 and a display picture signal 206 corresponding to the information triggering signal 204, and the low-speed transmission signal 22 comprises at least a triggering control signal 220. Under such circumstances, the triggering control signal 220 cooperates with the location information LOC to be transmitted to different source drivers SD_1-SD_N. When the source drivers SD_1-SD_N receive the control triggering signal 200 transmitted by the high-speed transmission lines D0_PN_1-D0_PN_N and D1_PN_1-D0_PN_N, the source drivers SD_1-SD_N are correspondingly triggered to receive the control signal 202. Also, when the source drivers SD_1-SD_N receives the information triggering signal 204 via the high-speed transmission lines D0_PN_1-D0_PN_N and D1_PN_1-D0_PN_N, the source drivers SD_1-SD_N are correspondingly triggered to receive the display picture signal 206.

However, the conventional display device needs to utilize the high-speed transmission lines D0_PN_1-D0_PN_N and D1_PN_1-D0_PN_N with the one-to-one differential signal transmission method to transmit the control signal from the timing controller 100 to the exclusive source drivers SD_1-SD_N. Accordingly, the conventional display device has no choice but to utilize lots of transmission lines, which is difficult for developing high-speed transmission application of high resolution display devices with thinner/lighter hardware weights and less costs. Therefore, it has been an important issue to provide another efficient transmission method for the display device.

SUMMARY OF THE INVENTION

A transmission method for a display device is provided to utilize a one-to-many timing controller to transmit a display signal to a plurality of source drivers.

According to an aspect of the disclosure, a transmission method for a display device is provided, wherein the display device comprises a one-to-many timing controller and a plurality of source drivers. The transmission method comprises determining whether the plurality of source drivers being operated in different operational modes are switched on or off according to a command signal, to receive a display information of the one-to-many timing controller, wherein the display information comprises at least a first control triggering signal, a first control signal, a first display information triggering signal, a first display signal, a second display information triggering signal and a second display signal, and the command signal is an internal setting signal or an external setting signal.

These and other objectives of the present invention will no doubt become obvious to those of ordinary skill in the art after reading the following detailed description of the preferred embodiment that is illustrated in the various figures and drawings.

DETAILED DESCRIPTION

The specification and the claims of the present invention may use a particular word to indicate an element, which may have diversified names named by distinct manufacturers. The present invention distinguishes the element depending on its function rather than its name. The phrase "comprising" used in the specification and the claim is to mean "is inclusive or open-ended but not exclude additional, un-recited elements or method steps." In addition, the phrase "electrically connected to" or "coupled" is to mean any electrical connection in a direct manner or an indirect manner. Therefore, the description of "a first device electrically connected or coupled to a second device" is to mean that the first device is connected to the second device directly or by means of connecting through other devices or methods in an indirect manner.

Figure 1:
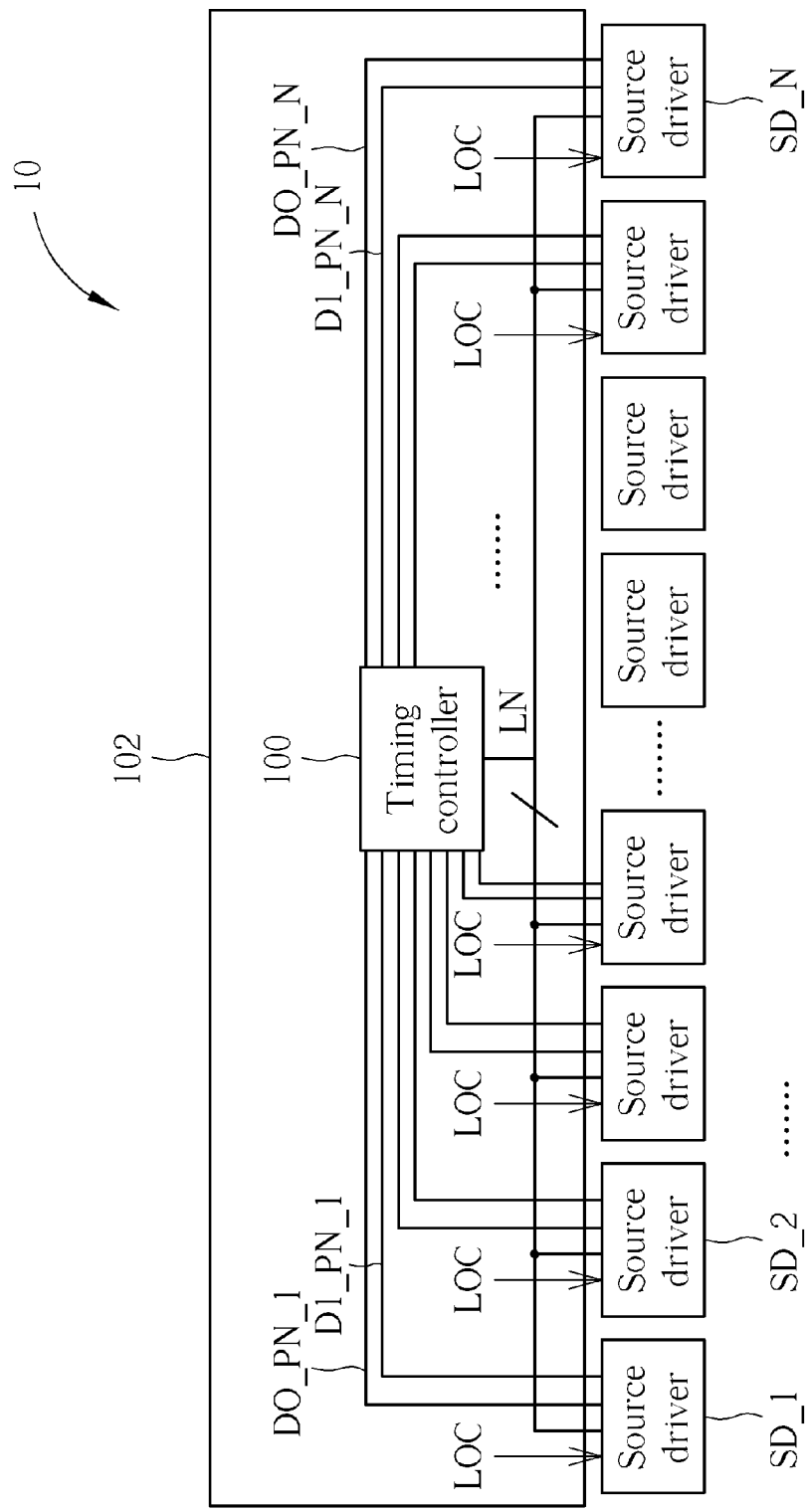
FIG. 1 illustrates a schematic diagram of a conventional display device.
Figure 2:
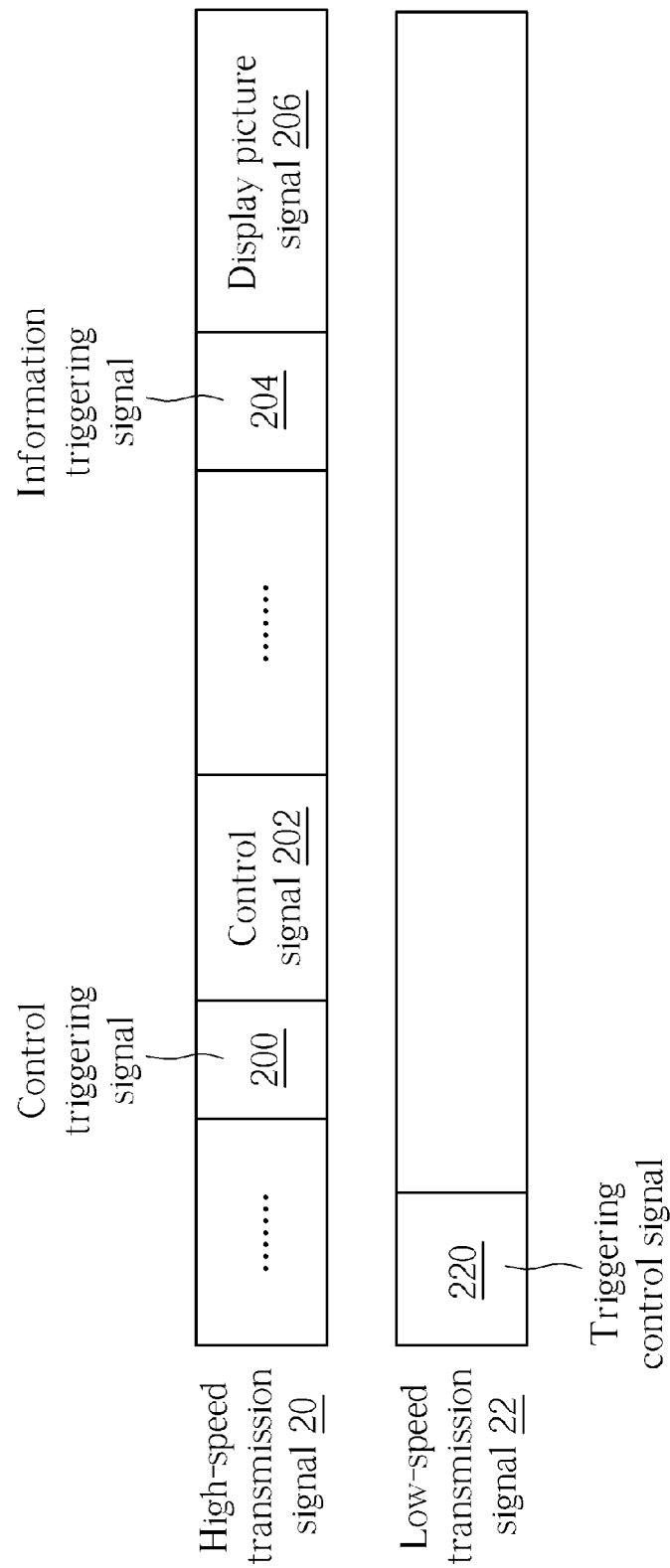
FIG. 2 illustrates a schematic diagram of a conventional transmission signal between the timing controller and one of the source drivers.
Figure 3:
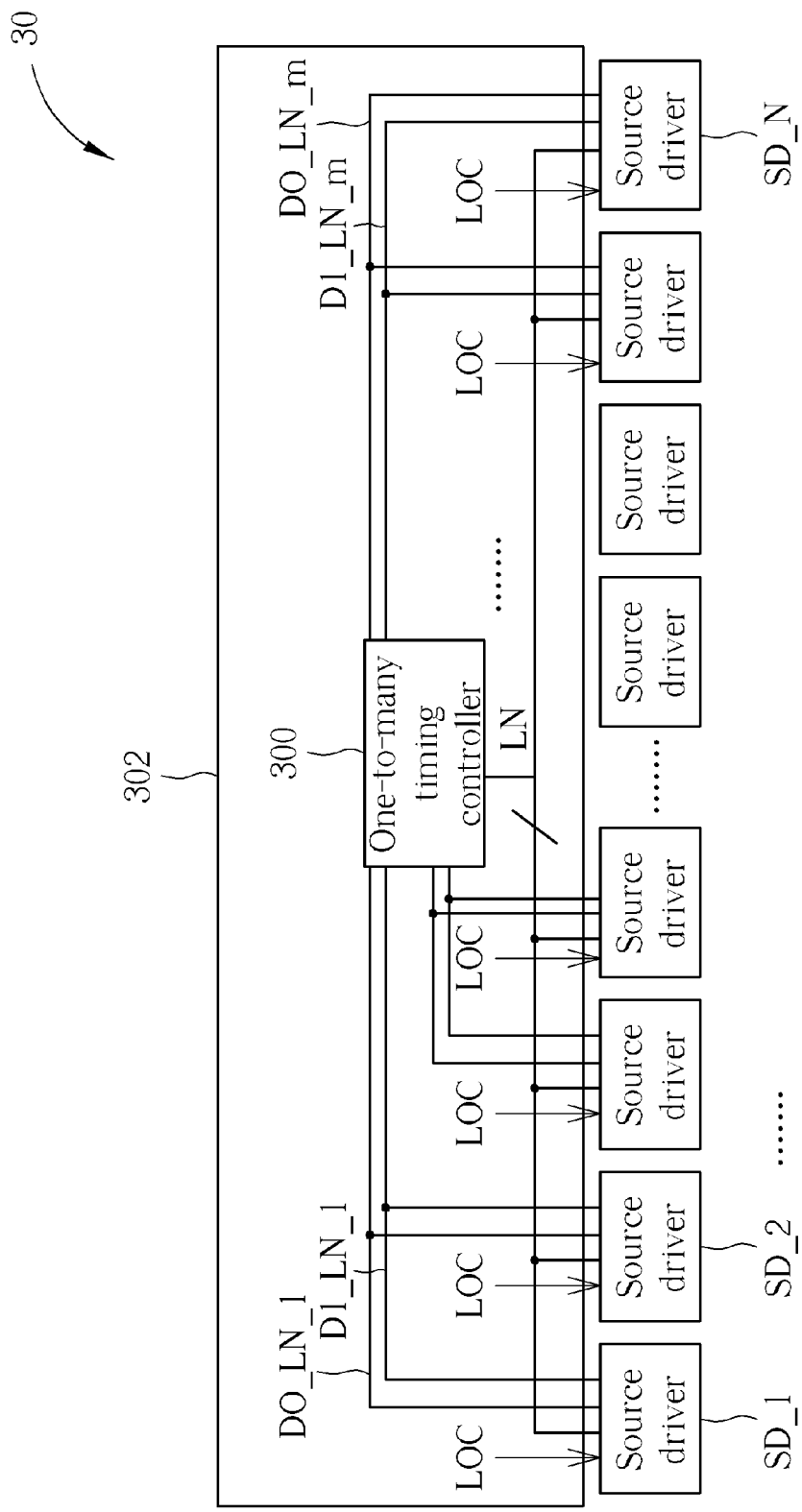
FIG. 3 illustrates a schematic diagram of a display device according to an embodiment of the invention.

Please refer to FIG. 3, which illustrates a schematic diagram of a display device 30 according to an embodiment of the invention. As shown in FIG. 3, the display device 30 has a basic structure comprising a display device control chip, a gate controller, a source controller, a timing controller, a backlight module, a plurality of display units and a display device, which is well known to those skilled in the art. For brevity, the display device 30 shown in FIG. 3 only depicts a one-to-many timing controller 300, source drivers SD_1-SD_N, high-speed transmission line sets D0_LN_1, D1_LN_1-D0_LN_m, D1_LN_m and a low-speed transmission line LN, and all of them are disposed on a circuit board 302. The one-to-many timing controller 300 of the embodiment is coupled to a display device control chip (not shown in the figure) to control signal transmission between the one-to-many timing controller 300 and the source drivers SD_1-SD_N. Preferably, every two source drivers of the embodiment of FIG. 3 are coupled together to share one transmission line set, e.g. the source drivers SD_1 and SD_2 receiving differential pair signals from the transmission line set D0_LN_1 and D1_LN_1, the source drivers SD_3 and SD_4 receiving differential pair signals from the transmission line set D0_LN_2 and D1_LN_2, . . . , and the source drivers SD_N–1 and SD_N receiving differential pair signals from the transmission line set D0_LN_m and D1_LN_m. Those skilled in the art can adaptively modify the embodiment of the invention to have more than two source drivers share the same one transmission line set for receiving the same differential pair signal, which is also in the scope of the invention.

Figure 5:
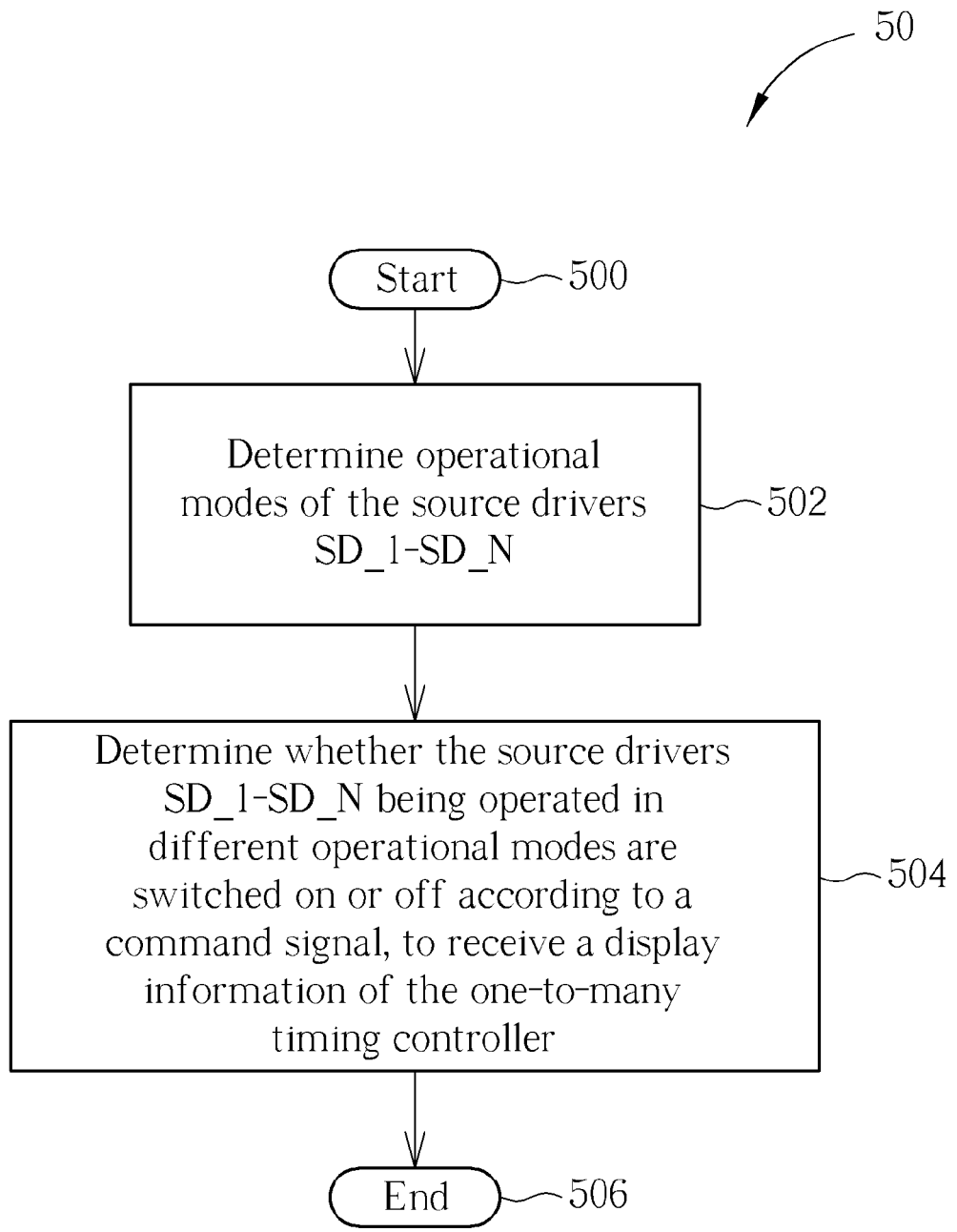
FIG. 5 illustrates a flow chart of a transmission process according to an embodiment of the invention.

Furthermore, a transmission method of the display device 30 of the invention can be summarized as a transmission process 50, as shown in FIG. 5, to be interpreted as a programming code and store in a storage unit of the display device control chip. The transmission process 50 includes the following steps:

Step 500: Start.

Step 502: Determine operational modes of the source drivers SD_1-SD_N.

Step 504: Determine whether the source drivers SD_1-SD_N being operated in different operational modes are switched on or off according to a command signal, to receive a display information of the one-to-many timing controller.

Step 506: End.

In other words, the transmission process 50 for the display device 30 of the invention can be understood in the following paragraphs. In step 502, connections of the source drivers SD_1-SD_N are initially recognized/determined to set operational modes of the source drivers SD_1-SD_N. The operational modes of the invention comprise a lead mode and a cascade mode to represent a connection sequence between the source drivers being coupled together. For example, the first source driver of a plurality of source drivers being coupled together is set as the lead mode, and the other source drivers being coupled to the first source driver are set as the cascade mode. Each source driver of the invention comprises an exclusive location information LOC to determine a relative position of the source drivers SD_1-SD_N corresponding to the display device, so as to determine/set the operational modes of the source drivers SD_1-SD_N.

Next, in step 504, the command signal of the invention is utilized to set the operational modes of the source drivers SD_1-SD_N to be tuned on or off, which means the command signal is utilized to enable or shut down the source drivers SD_1-SD_N, such that the source drivers can correspondingly receive differential pair signals of the one-to-many timing controller 300 at different operational periods, wherein the differential pair signals is the display information of the display device 30. Preferably, the command signal of the embodiment can be generated via the low-speed transmission line LN of the one-to-many timing controller 300, or may be generated via an external pin. In other words, the command signal of the embodiment can be an internal setting signal or an external setting signal, and the following paragraphs demonstrate the detail operations of the two types of the command signal.

Figure 4:
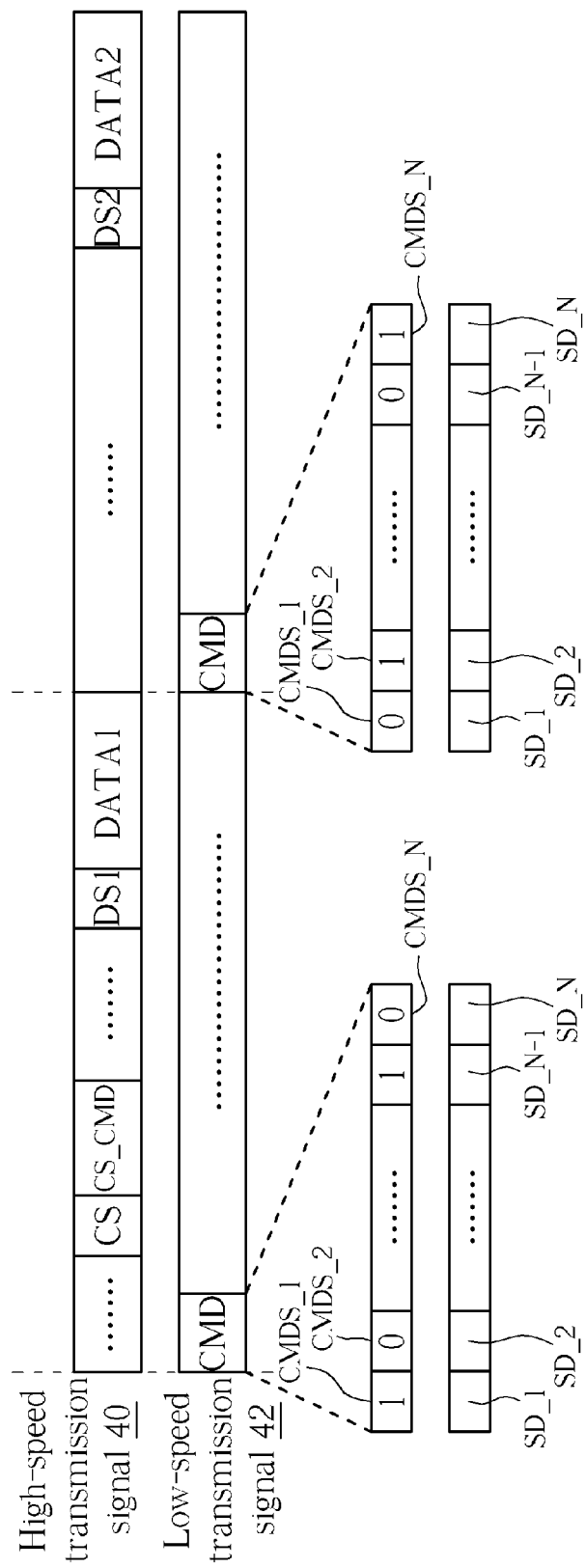
FIG. 4 illustrates a schematic diagram of a transmission signal between the one-to-many timing controller and ones of the source drivers being coupled together shown in FIG. 3 according to an embodiment of the invention.

Please refer to FIG. 4, which illustrates a schematic diagram of a transmission signal between the one-to-many timing controller 300 and ones of the source drivers SD_1-SD_N being coupled together shown in FIG. 3 according to an embodiment of the invention. In the embodiment, the coupled source drivers are, for example, a first source driver SD_1 and a second source driver SD_2, which is not limiting the scope of the invention. Besides, the command signal of the embodiment is an initiation control signal CMD generated via the low-speed transmission line LN to correspondingly set the operational modes of the source drivers SD_1 and SD_2. As shown in FIG. 3 and FIG. 4, the timing controller 100 and the source drivers SD_1 and SD_2 utilize the high-speed transmission line set D0_LN_1 and D1_LN_1 to transmit a high-speed transmission signal 40 and utilize the low-speed transmission line LN to transmit a low-speed transmission signal 42. Preferably, the high-speed transmission signal 40 is the differential pair signal and corresponds to the display information of the display device 30, and comprises at least a control triggering signal CS, a control signal CS_CMD corresponding to the control triggering signal CS, a first display information triggering signal DS1, a first display signal DATA1, a second display information triggering signal DS2 and a second display signal DATA2. The low-speed transmission signal 42 comprises at least two repeatable initiation control signals CMD. Noticeably, the control triggering signal of the embodiment is utilized to inform the source drivers SD_1-SD_2 of when to receive the control signal CS_CMD, and the first display information triggering signal DS1 and the second display information triggering signal DS2 are utilized to inform the source drivers SD_1-SD_2 of when to receive the first display signal DATA1 and the second display signal DATA2. According to different requirements of the embodiment, the first display information triggering signal DS1 and the second display information triggering signal DS2 can be adaptively designed to be identical, and the control triggering signal CS can also be classified into control triggering signals CS1 and CS2 to be transmitted to the source drivers SD_1-SD_2, respectively.

In detail, the source drivers SD_1-SD_2 of the embodiment are set as the lead mode and the cascade more, respectively, according to connections of the source drivers SD_1-SD_2. Next, the initiation control signal CMD of the low-speed transmission signal 42 further comprises a plurality of sub initiation control signals CMDS_1-CMDS_N, such that the source drivers SD_1-SD_2 can adaptively switch the operational modes thereof to be a enable mode or a shut-down mode according to the corresponding sub initiation control signals CMDS_1-CMDS_2. Accordingly, the sub initiation control signals CMDS_1-CMDS_2 of the embodiment can be utilized to enable or shut down the source drivers SD_1-SD_2, such that the source driver SD_1 sequentially receives the control triggering signal CS, the control signal CS_CMD, the display information triggering signal DS and the first display signal DATA1 in a first enable period, and the source driver SD_2 is shut down (i.e. being switched off) in the first enable period. Next, when the source driver SD_1 has received the first display signal DATA1, the sub initiation control signals CMDS_1-CMDS_2 of the initiation control signal CMD are utilized to switch the operational modes of the source drivers SD_1-SD_2, such that the source drivers SD_1-SD_2 are switched to be the shut-down mode and the enable mode, respectively. Accordingly, the source driver SD_1 is turned off in a second enable period after the first enable period, and the source driver SD_2 is turned on (i.e. being in the enable mode) in the second enable period. Also, the source driver SD_2 shares the control triggering signal CS and the control signal CS_CMD already received by the source driver SD_1, and accordingly, sequentially receives the display information triggering signal DS and the second display signal DATA2.

Those skilled in the art can adaptively modify conceptions of the embodiment to be applied to other embodiments comprising a plurality of source drivers SD_1-SD_N being coupled together, and accordingly, the sub initiation control signals CMDS_1-CMDS_N of the initiation control signal CMD can be utilized to correspondingly switch the operational modes of the source drivers SD_1-SD_N to be the enable mode or the shut-down mode at different enable periods, such that the source drivers SD_1-SD_N can receive a plurality of information triggering signals and a plurality of display signals, respectively, and share the control triggering signal and the control signal, which is also in the scope of the invention. Besides, the sub initiation control signals CMDS_1-CMDS_N of the initiation control signal CMD of the embodiment can also be realized as a high-level/low-level signal to correspondingly set the operational modes of the source drivers SD_1-SD_N, e.g. the digital signal of 1 or 0, and those skilled in the art can also utilize other digital logic signals/modules to cooperate with the realization of the embodiment of the invention, which is not limiting the scope of the invention.

In comparison with the prior art, the one-to-many timing controller 300 of the embodiments shown from FIG. 3 to FIG. 5 can utilize the high-speed transmission line sets D0_LN_1, D1_LN_1-D0_LN_m, D1_LN_m to transmit the display information (i.e. the high-speed transmission signal 40) to the source drivers SD_1-SD_N, and the source drivers SD_1-SD_N share the high-speed transmission line sets D0_LN_1, D1_LN_1-D0_LN_m, D1_LN_m to avoid installation/disposition of lots of transmission line sets (or transmission lines) inside the display device 30.

Figure 6:
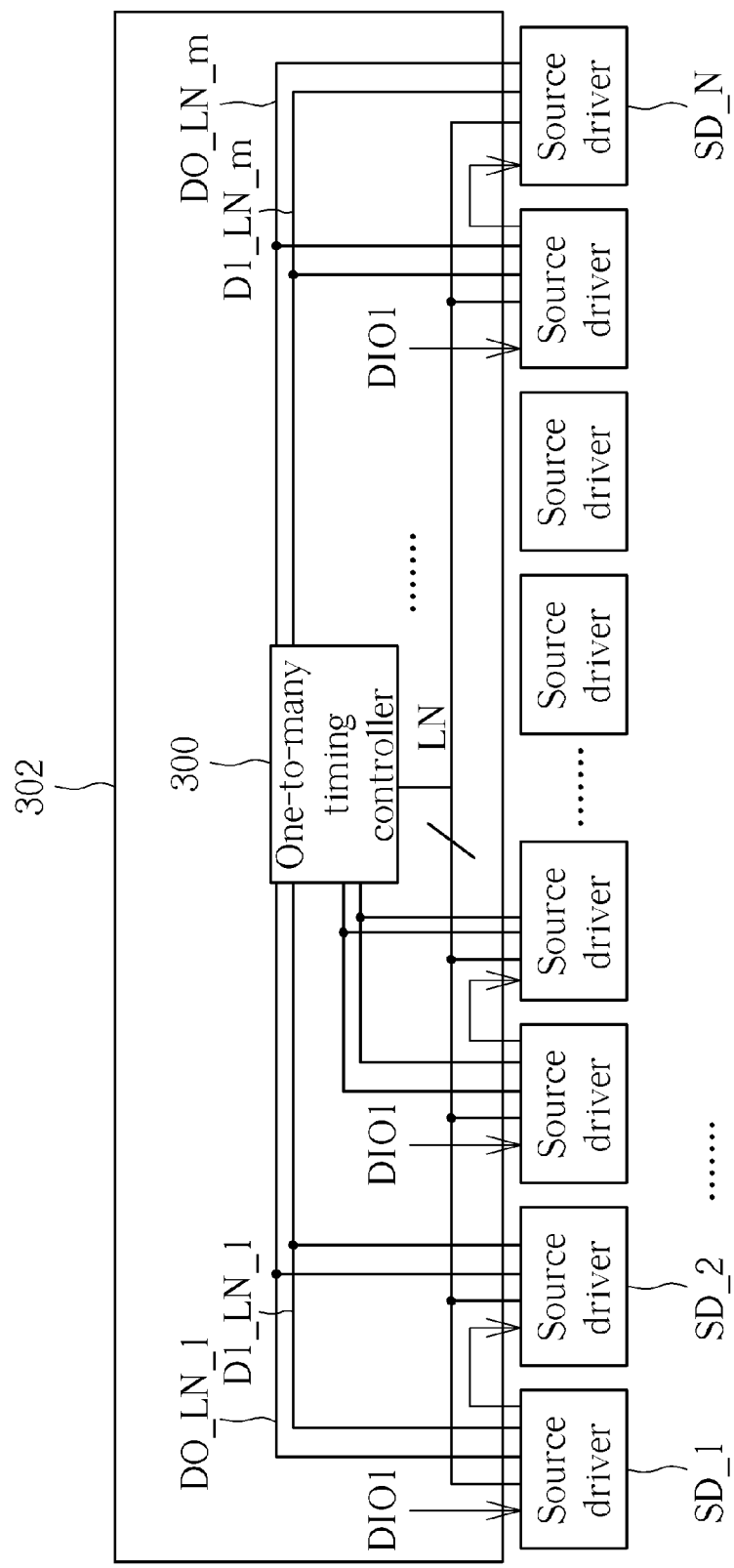
FIG. 6 illustrates a schematic diagram of another display device according to an embodiment of the invention.

Please refer to FIG. 6, which illustrates a schematic diagram of another display device 80 according to an embodiment of the invention. As shown in FIG. 6, the display device 80, in comparison with the display device 30 shown in FIG. 3, also comprises the one-to-many timing controller 300, the circuit board 302, the source drivers SD_1-SD_N, the high-speed transmission line sets D0_LN_1, D1_LN_1-D0_LN_m, D1_LN_m and the low-speed transmission line LN. A difference between the display devices 30 and 80 is that the source drivers SD_1-SD_N of the display device 80 utilize position information of the source drivers SD_1-SD_N and an external pin for receiving an external control signal DIO1, such as an external pulse signal, to set the operational modes of the source drivers SD_1-SD_N, i.e. the command signal of the embodiment shown in FIG. 6 is obtained as the external setting signal via the external pin.

Figure 7:
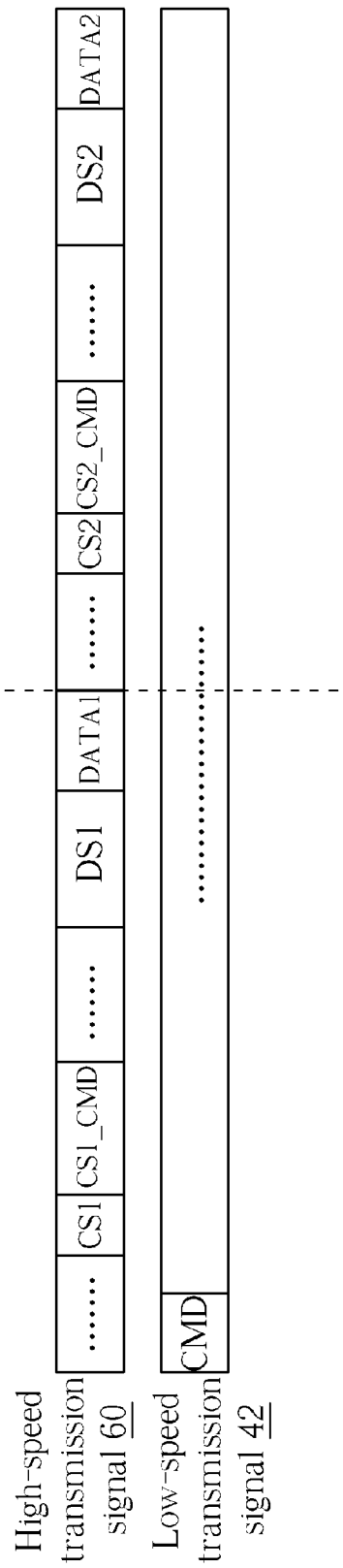
FIG. 7 illustrates a schematic diagram of a detailed transmission signal between the one-to-many timing controller and the source drivers being coupled together according to an embodiment of the invention.

Please refer to FIG. 7, which illustrates a schematic diagram of a detailed transmission signal between the one-to-many timing controller 300 and the source drivers SD_1-SD_N being coupled together according to an embodiment of the invention. In the embodiment, the first source driver SD_1 is coupled to the second source driver SD_2, and the command signal of the embodiment is the external setting signal. As shown in FIG. 3 and FIG. 7, a high-speed transmission signal 60 comprises a first control triggering signal CS1, a first control signal CS1_CMD corresponding to the first control triggering signal CS1, a first display information triggering signal DS1, a first display signal DATA1, a second control triggering signal CS2, a second control signal CS2_CMD corresponding to the second control triggering signal CS2, a second display information triggering signal DS2 and a second display signal DATA2. In other words, the high-speed transmission signal 60 shown in FIG. 7, in comparison with the high-speed transmission signal 40 shown in FIG. 4, comprises two control triggering signals CS1_CMD and CS2_CMD to be provided to the source drivers SD_1-SD_2, respectively. Under such circumstances, the source drivers SD_1-SD_2 of the embodiment can utilize the connection thereof (e.g. being initially set via the external pin or a LOC pin) to be set as the lead mode or the cascade mode. The source driver SD_1 being set as the lead mode is triggered by the first control triggering signal CS1 to receive the first control signal CS1_CMD, and is also triggered by the first display information triggering signal DS1 to receive the first display signal DATA1. Also, the source driver SD_2 is triggered by the second control triggering signal CS2 to receive the second control signal CS2_CMD, and is also triggered by the second display information triggering signal DS2 to receive the second display signal DATA2. The timing controller 300 sequentially transmits the related signals for the source drivers SD_1-SD_2, which is shown in detail in FIG. 8. Noticeably, the first control triggering signal CS1 and the second control triggering signal CS2 of the embodiment are utilized to inform the source drivers of when to receive the first control signal CS1_CMD and the second control signal CS2_CMD, and the first display information triggering signal DS1 and the second display information triggering signal DS2 are utilized to inform the source drivers of when to receive the first display signal DATA1 and the second display signal DATA2. Besides, the embodiment shown in FIG. 7 can utilize same control triggering signal to trigger the source drivers being set as the lead mode or the cascade mode for receiving the initiation control signal CMD, which means the first control triggering signal CS1 and the second control triggering signal CS2 are identical. For considering the reception of different display information, the first display information triggering signal DS1 and the second display information triggering signal DS2 are still utilized for triggering the source drivers SD_1-SD_2, respectively. The same control triggering signal CS can also be utilized for triggering, to adaptively reduce a total amount of related transmission signal(s), and related setting demonstration hereinafter of the control triggering signal is not limiting the scope of the invention as well.

Figure 8:
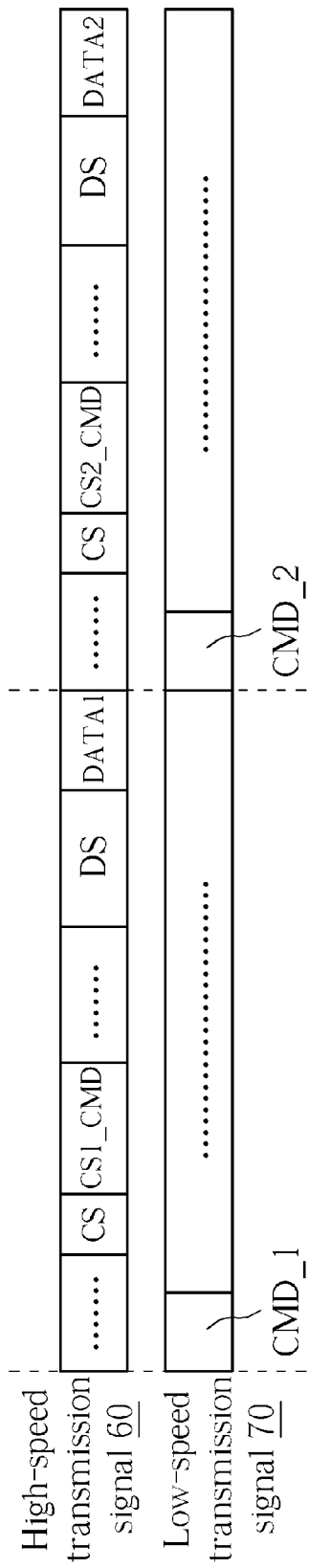
FIG. 8 illustrates a schematic diagram of another detailed transmission signal between the one-to-many timing controller and the source drivers being coupled together according to an embodiment of the invention.

Furthermore, please refer to FIG. 8, which illustrates a schematic diagram of another detailed transmission signal between the one-to-many timing controller 300 and the source drivers SD_1-SD_2 being coupled together according to an embodiment of the invention, wherein the connection of the source drivers SD_1-SD_2 of the embodiment can utilize the external pin or the LOC pin to be correspondingly obtained. In comparison with the low-speed transmission signal 42 shown in FIG. 7, a low-speed transmission signal 70 shown in FIG. 8 comprises a first initiation signal CMD_1 and a second initiation signal CMD_2 to be utilized to switch on the source drivers being set as the lead mode or the cascade mode. The turned on source driver SD_1 or the turned on source driver SD_2 is triggered to correspondingly receive the display information (i.e. the high-speed transmission signal 60), where related operations can also be understood via the embodiment shown in FIG. 7 and are not described hereinafter.

Figure 9:
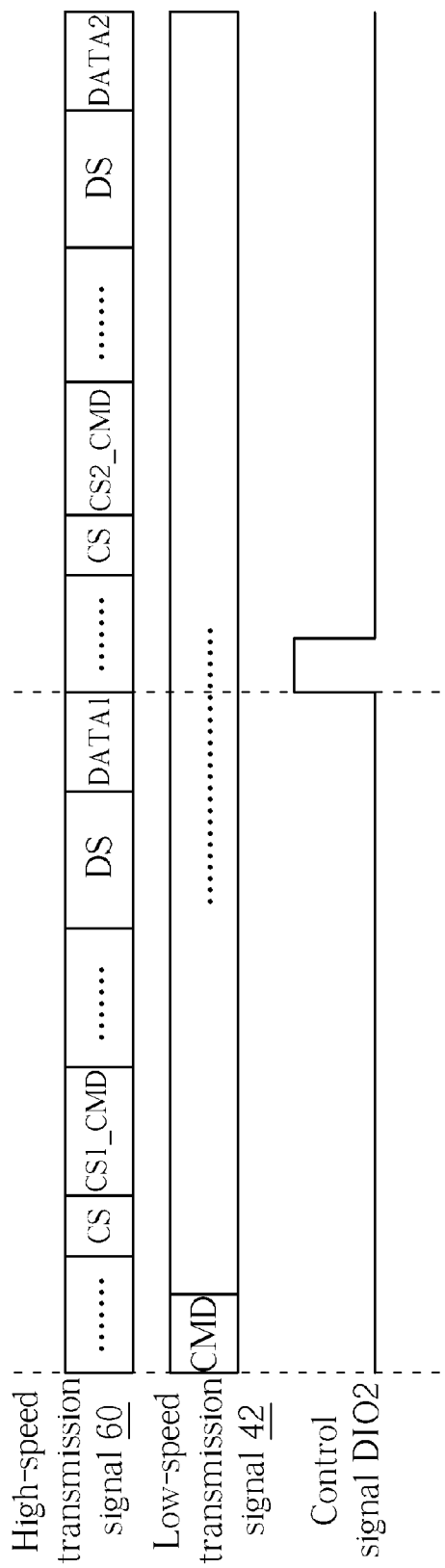
FIG. 9 illustrates a schematic diagram of another detailed transmission signal between the one-to-many timing controller and the source drivers being coupled together shown in FIG. 6 according to an embodiment of the invention.

Moreover, please refer to FIG. 9, which illustrates a schematic diagram of another detailed transmission signal between the one-to-many timing controller 300 and the source drivers SD_1-SD_N being coupled together shown in FIG. 6 according to an embodiment of the invention. In the embodiment, the first source driver SD_1 is coupled to the second source driver SD_2, which is not limiting the scope of the invention. Also, the embodiment shown in FIG. 9 comprises the high-speed transmission signal 60 and the low-speed transmission signal 42 shown in FIG. 70, and further comprises another control signal DIO2. As shown in FIG. 6 and FIG. 9, the source drivers SD_1-SD_N of the display device 80 of the embodiment can also be classified into different groups (sets), i.e. being classified due to different positions of the source drivers, to correspondingly form a plurality of source driver sets. For example, each source driver set comprises at least the first source driver SD_1 and the second source driver SD_2 being set as the lead mode and the cascade mode, and the two source drivers can utilize one transmission line to be electrically connected. After the first source driver SD_1 has received the external control signal DIO1 and finished related operations, the first source driver SD_1 generates another control signal DIO2 (e.g. another pulse setting signal) to be transmitted to the second source driver SD_2, and accordingly, the operational mode of the second source driver SD_2 can be adaptively changed.

In detail, if the first source driver set as the lead mode is connected via the external setting signal DIO1 and the second source driver SD_2 set as the cascade mode is shut down, the first source driver SD_1 correspondingly receives the high-speed transmission signal 60, which comprises the first control triggering signal CS1, the first control signal CS1_CMD, the first display information triggering signal DS1 and the first display signal DATA1. After receiving the first display signal DATA1, the first source driver SD_1 correspondingly transmits the control signal DIO2 (e.g. the pulse signal shown in FIG. 9) to the second source driver SD_2. Accordingly, the second source driver SD_2 can adaptively change the operational mode thereof after receiving the control signal DIO2, and sequentially receives the second control triggering signal CS2, the second control signal CS2_CMD, the second display information triggering signal DS2 and the second display signal DATA2. The second source driver SD_2 can share the first control triggering signal CS1 and the first control signal CS1_CMD with the source driver SD_1, and correspondingly receives the second display information triggering signal DS2 and the second display signal DATA2 after being triggered by the control signal DIO2, which is also in the scope of the invention.

Those skilled in the art can adaptively modify the embodiments of the invention to alter/adjust a number of the source drivers of each source driver set, e.g. each source driver set comprises four source drivers being electrically coupled together and the first source driver is set as the lead mode and the other source drivers are set as the cascade mode, where the command signal is sequentially transmitted to each source driver for adjusting/setting the operational mode thereof. Accordingly, the plurality of source drivers and the one-to-many timing controller 300 of the invention can share the transmission line together and the exclusive display information of the four source drivers can be simultaneously transmitted. Besides, the display device of the invention can utilize a control mechanism as combination of the initiation control signal CMD and the external control signal DIO1 or other generation methods/ways of the external control signal DIO1, to adaptively change/adjust the operational modes of the source drivers SD_1-SD_N. Alternatively, other timing controllers/signals can also be applied to the embodiments of the invention to greatly reduce transmission lines of the display device, which is also in the scope of the invention.

In summary, embodiments of the invention provide a display device comprising a one-to-many timing controller, a plurality of source drivers, high-speed transmission line sets and a low-speed transmission line. Accordingly, the plurality of source drivers being set as different operational modes receive the command signal, to correspondingly adjust/change operational modes thereof, so as to determine whether the plurality of source drivers receive the display information transmitted by the one-to-many timing controller. Also, the command signal of the embodiments can be the internal setting signal or the external setting signal. In comparison with the prior art utilizing lots of transmission lines, the plurality of source drivers of the invention can share transmission lines (or transmission line sets) to greatly reduce complex designs of the transmission lines (or the transmission line sets), so as to achieve thinner size or lighter weight of the display device and to increase application ranges of high-speed differential signal transmission of the display device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A transmission method for a display device, the display device comprises a one-to-many timing controller and a plurality of source drivers, the transmission method comprising:
    determining whether the plurality of source drivers being operated indifferent operational modes are switched on or off according to a command signal, to receive a display information of the one-to-many timing controller;
    wherein the display information comprises at least a first control triggering signal, a first control signal, a first display information triggering signal, a first display signal, a second display information triggering signal and a second display signal, and the command signal is an internal setting signal or an external setting signal.

2. The transmission method of claim 1, wherein the operational modes comprise a lead mode and a cascade mode, the display information is a differential pair signal, and the one-to-many timing controller simultaneously transmits the display information to a first source driver and a second source driver coupled to the first source driver, of the plurality of source drivers, wherein the first source driver is set to be the lead mode and the second source driver is set to be the cascade mode.

3. The transmission method of claim 2, wherein when the command signal is generated by a low-speed transmission line of the one-to-many timing controller, the command signal is the internal setting signal to set the first source driver and the second source driver as being turned on and off, so as to receive the display information of the one-to-many timing controller.

4. The transmission method of claim 3, wherein the command signal comprises at least an initiation control signal, and the initiation control signal comprises a plurality of sub initiation control signals; when the sub initiation control signals are a high-level signal, the first source driver or the second source driver is set to be turned on for receiving the display information; when the sub initiation control signals are a low-level signal, the first source driver or the second source driver is set to be turned off for not receiving the display information.

5. The transmission method of claim 3, wherein a plurality of sub initiation control signals of the initiation control signal initially set the first source driver to be turned on and set the second source driver to be turned off, such that the first source driver sequentially receives the first control triggering signal, the first control signal, the first display information triggering signal and the first display signal; and accordingly, the plurality of sub initiation control signals of the initiation control signal set the first source driver to be turned off and set the second source driver to be turned on, such that the second source driver sequentially receives the second display information triggering signal and the second display signal.

6. The transmission method of claim 2, wherein when the command signal is generated by an external pin, the command signal is the external setting signal to set the first source driver and the second source driver to be turned on or off, respectively, so as to receive the display information of the one-to-many timing controller.

7. The transmission method of claim 6, wherein the command signal comprises at least an initiation control signal, and the initiation control signal comprises a plurality of sub initiation control signals; when the sub initiation control signals are a high-level signal, the first source driver or the second source driver is set to be turned on for receiving the display information; when the sub initiation control signals are a low-level signal, the first source driver or the second source driver is set to be turned off for not receiving the display information.

8. The transmission method of claim 6, wherein the display information further comprises a second control triggering signal and a second control signal, and a plurality of sub initiation control signals of the initiation control signal initially set the first source driver to be turned on and set the second source driver to be turned off, such that the first source driver sequentially receives the first control triggering signal, the first control signal, the first display information triggering signal and the first display signal; and accordingly, the plurality of sub initiation control signals of the initiation control signal set the first source driver to be turned off and set the second source driver to be turned on, such that the second source driver sequentially receives the second control triggering signal, the second control signal, the second display information triggering signal and the second display signal.

9. The transmission method of claim 6, wherein the first source driver and the second source driver form a source driver set, and when the first source driver has received the first display signal, the first source driver correspondingly transmits a pulse setting signal to the second source driver to switch the second source driver, which is turned off, on for receiving the display signal.

10. The transmission method of claim 1, further comprising utilizing a position information of each source driver to correspondingly transmit the command signal to the plurality of source drivers.

11. The transmission method of claim 1, wherein the operational modes of the plurality of source drivers are correspondingly set as a lead mode or a cascade mode according to an address information of each source driver or an external pin, and a source driver being set as the lead mode is triggered by the first control triggering signal to receive the first control signal and is triggered by the first display information triggering signal to receive the first display signal, and a source driver being set as the cascade mode is triggered by a second control triggering signal to receive a second control signal and is triggered by the second display information triggering signal to receive the second display signal.

* * * * *